C. P. CIRAC.
SAFETY REVERSE MOVEMENT LOCK FOR AUTOMOBILES.
APPLICATION FILED JUNE 4, 1919.

1,362,783.

Patented Dec. 21, 1920.
2 SHEETS—SHEET 1.

INVENTOR
Charles P. Cirac
BY
Bradley L. Benson
ATTORNEY

C. P. CIRAC.
SAFETY REVERSE MOVEMENT LOCK FOR AUTOMOBILES.
APPLICATION FILED JUNE 4, 1919.
1,362,783.
Patented Dec. 21, 1920.
2 SHEETS—SHEET 2.
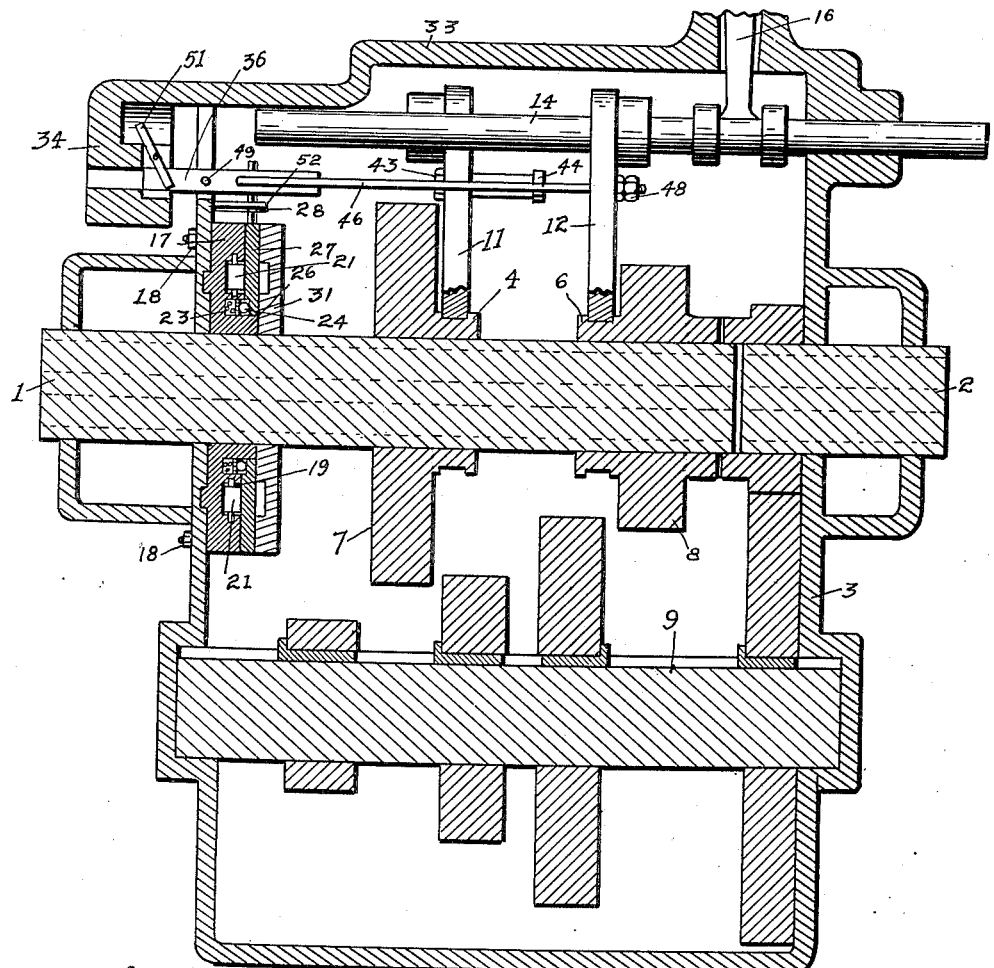
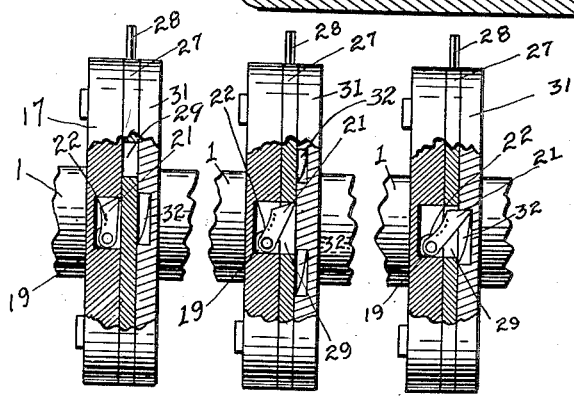
INVENTOR
Charles P. Cirac
BY
Bradley L. Benson
ATTORNEY

UNITED STATES PATENT OFFICE.

CHARLES P. CIRAC, OF FALLON, NEVADA.

SAFETY REVERSE-MOVEMENT LOCK FOR AUTOMOBILES.

1,362,783.   Specification of Letters Patent.   Patented Dec. 21, 1920.

Application filed June 4, 1919. Serial No. 301,806.

*To all whom it may concern:*

Be it known that I, CHARLES P. CIRAC, a citizen of the United States, and a resident of the city of Fallon, county of Churchill, State of Nevada, have made a new and useful invention, to wit—Safety Reverse-Movement Lock for Automobiles; and I do hereby declare the following to be a full, clear, concise, and exact description of the same.

This invention relates to a new, novel and useful improvement in safety reverse movement locks for automobiles.

The principal object of this invention is to provide means for preventing accidental backward movement of an automobile when the same is unattended or when backward movement is not desired.

Another object is to prevent any backward movement of an automobile while on an incline, independent of the brakes carried by the car or the failure of said brakes to operate, which might result in serious accident.

Another object is to prevent backing of a car through failure of the engine and inability to apply the brakes quickly enough to stop backward movement.

Other objects will be seen as the description proceeds.

This invention relates particularly to a means of operating a reverse stop mechanism, such as is covered by Letters Patent No. 1,237,169 issued to me August 14th, 1917, the difference in this application being that the stop ratchets are located within the gear shift box instead of at the wheels as in the patent above referred to.

In the accompanying drawings:—

Fig. 4 is a cross section of a gear box with my invention applied thereto, and

Figs. 5, 6 and 7 are diagrammatic views partly in cross section illustrating the progressive action of the stop mechanism.

Figure 1:
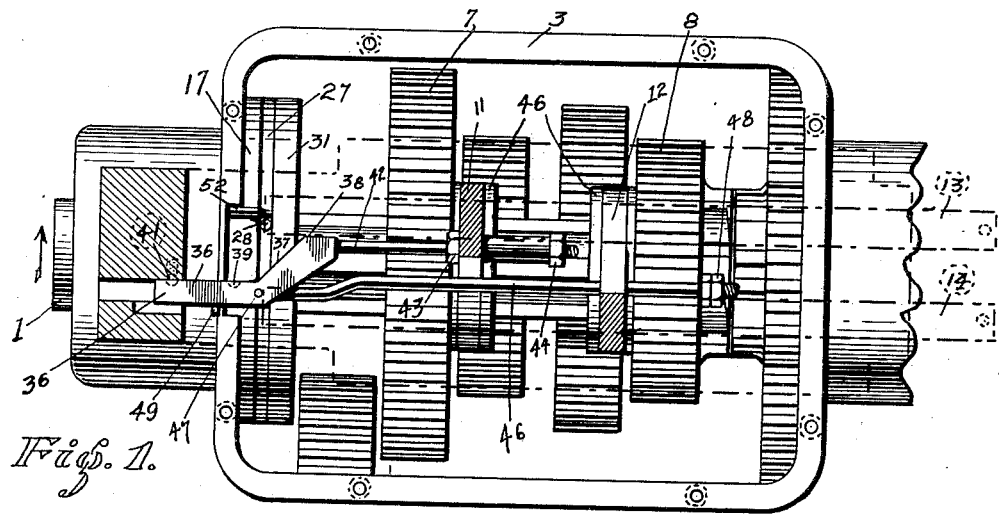
Figure 1 is a top plan view of a gear box with my invention applied thereto, and with the usual shifting lever and cover removed for purposes of better illustration, the gears being arranged in neutral position.

In the drawings, the numeral 1 designates a propeller shaft rotating in the direction of the arrow. This propeller shaft is driven through the usual gear connections from an engine shaft 2, see Fig. 4. The numeral 3 indicates a gear box of the usual construction adapted to receive and house the usual sliding gears of an automobile transmission. The numerals 4 and 6 refer to grooved collars carried by the gears 7 and 8. These gears are slidable upon the shaft 1 which is provided with the usual longitudinal projections which fit within corresponding slots in said gears. These gears are moved longitudinally along the shaft 1 for the purpose of meshing with gears carried on the shaft 9, which is mounted below and parallel to the shaft 1. The collars 4 and 6 receive bifurcated ends of yokes 11 and 12, the upper ends of which are rigidly attached to selector bars 13 and 14. These selector bars are moved independently by means of the usual hand lever, the lower of which is shown at 16.

All of this structure is well known and needs no further description.

At 17 I have shown a stationary member adapted to be bolted by bolts 18 to the gear box 3. This stationary member 17 surrounds the propeller shaft 1, and is provided with recesses 19 in radial alinement to the shaft 1. These recesses are adapted to receive and retain dogs 21 having their pivots in radial alinement to the shaft 1. These dogs are pressed outwardly or away from the stationary member 17 by springs 22. A collar 26 is formed on the member 17 which is adapted to carry a plate 27 and a spring 23 and ball carrier 24. This plate may be rotated upon the collar 26 through the medium of a pin 28. This plate 27 is provided with orifices 29 which are so arranged that when the said plate is rotated these orifices may be brought into registry with the recesses 19 which will allow the dogs 21 to pass through said plate 27.

At 31, I have shown a plate keyed to the shaft 1 and adapted to rotate therewith. This plate is provided with ratchet shaped recesses 32 upon its face adjacent the plate 27, the purpose of which will be hereinafter described.

At 33, I have shown the usual gear box cover within which the selector bars 13 and 14 move.

It will be noted that at 34 I have provided my cover with an overhanging portion adapted to receive a slide 36 and retain the same in parallel alinement with the selector bars 13 and 14. This slide is square in cross section to prevent rotation and is provided with a cam surface 37 and a flat portion 38. The portion 36 is provided with ball sockets 39 to receive a spring pressed ball 41 carried in the overhanging portion 34. The purpose of this ball is to retain the slide 36 in either the position shown in Fig. 1 or that shown in Fig. 2. This slide 36 has a rearwardly extending rod 42 passing through the yoke 11 and provided with nuts 43 and 44 to limit the movement of said rod with relation to said yoke.

The numeral 46 designates a rod pivoted at 47 to the slide 36 and passing through the yoke 12. This rod is provided with a nut 48, the purpose of which will be hereinafter described. This slide 36 carries a pin 49 adapted to contact with the pivoted lever 51 having its upper end in line with the end of the selector bar 14.

The operation of my lock is as follows:—

Referring first to Figs. 5, 6 and 7, the member 17 is held stationary in the gear box and surrounds the propeller shaft. The member 27 is supported upon the collar 26. The member 31 is a ratchet member keyed to the shaft 1, and held against the plate 27. The spring 23 forces the ball carrier 24 against the plate 27 which in turn is held firmly against the ratchet member 31 which will tend to rotate this member 27 in the direction of the rotation of the shaft and member 31 were it not retained by the pin 28 against the pin 52 carried by the gear box. The disk 31 is provided on its contacting face with ratchet shaped depressions, the straight faces of said depressions being in the direction of rotation of the shaft 1.

The dogs before referred to and carried within the recesses 19 are pivoted so as to also extend in the direction of rotation. As long as the member 31 is rotating in the direction of the arrow, the friction between the same and the member 27 will cause the pin 28 to move into contact with the pin 52, which will cause the orifices 29 in the member 27 to be out of register with the depressions 19 to prevent any of the dogs 22 from projecting and coming in contact with the rotating surface of the rotating member 31.

Should, however, the vehicle carrying my lock start to move rearwardly, the shaft 1 will move in the direction opposite to that of the arrow, also the member 31 which will cause the member 27 to move in the same direction moving the pin 28 out of contact with the pin 52. As this occurs, the orifices 29 of the member 27 will be brought into alinement with the recesses 19 which allow the dogs 22 to project therethrough and come into contact with the member 31, and as this member is moving in a reverse direction, the end of the dogs 22 will contact with the straight side of the ratchet 32. This will prevent further rearward movement of the vehicle or reverse turning of the shaft 1. The movement of the plate 27 to accomplish this result is so slight and so positive that but a few inches of wheel movement is accomplished before this locking action takes place. The manner of controlling this lock is the subject matter of this invention. All of the matter heretofore described in the operation is clearly set forth in my Patent No. 1,237,169, issued to me August 14th, 1917.

The manner of control is as follows:—

Figure 2:
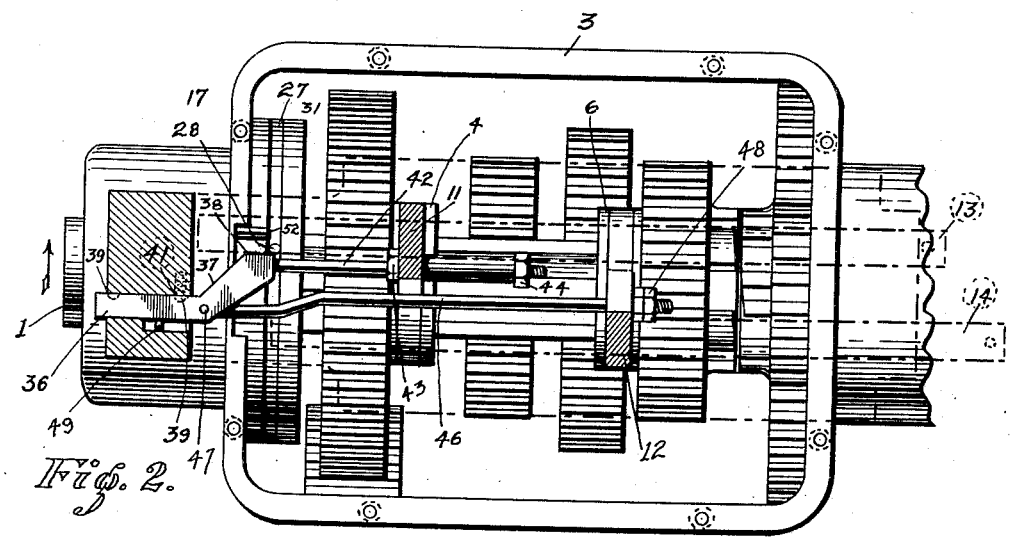
Fig. 2 is a view similar to Fig. 1 with the exception that the gears are arranged for reverse movement and my device is in reverse position.
Figure 3:
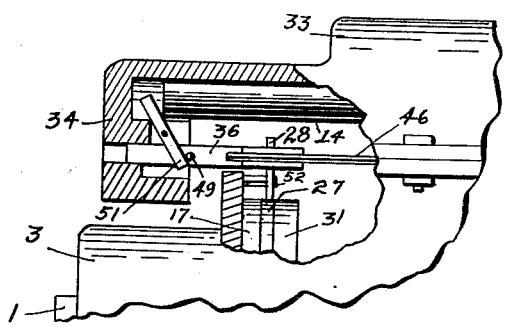
Fig. 3 is a fragmentary view partly in section designating part of the operating mechanism of my device.

In Fig. 1, the gears are shown in a neutral position, and my invention is shown in the position it will remain in during any shifting operation, with the exception of when the gears are set for reversing. The position which my invention will take when the gears are set for reversing is shown in Fig. 2.

Referring again to Fig. 1, it will be noted that the pin 28 is free to oscillate between the slide 36 and the pin 52. When the shaft 1 is moved in a forward direction, the rotation of the member 31 will cause the pin 28 to come in contact with the pin 52, and any movement of the yokes 11 or 12 to cause a gear change will not affect the position of the slide 36, as the yokes 11 and 12 will merely slide upon the rods 42 and 46. Should the vehicle attempt to move rearwardly while the slide 36 is in this position, the pin 28 will move away from the pin 52 and move toward the slide 36. This will allow the dogs 22 to come in contact with the member 31 and prevent further rotation in the reverse direction.

When it is desired to move a car rearwardly, the gears are shifted through the medium of the yoke 11 (see Fig. 2) which yoke will come in contact with the nut 43. This will cause the slide 36 to move to the position shown in this figure. Now, it will be seen that the pin 28 cannot move out of contact with the pin 52 for any appreciable distance, and consequently the disk 27 is held in a position to prevent the dogs 22 coming in contact with the revolving member 31, consequently the car can be moved rearwardly as desired. After rearward movement has been made, movement of the gear shift lever will cause the yoke 11 to move forwardly on the rod 43 to its neutral position but will leave the car unlocked. Any movement from neutral into any of the forward gears will immediately cause contact of yokes 11 or 12 with the nut 44 or 48 and move the slide 36 forwardly, which will again set the locking mechanism for operation, and any movement from a forward gear position will still leave the car unlocked.

To move the slide 36 out of contact with the pin 28 should a person attempt to go from reverse to neutral and then to second: assuming second to be a rearward movement of the selector bar similar to the reverse movement, I have provided a pivoted member 51 which is adapted to lie within the plane of the end of the selector bar 14. This results in the rearward movement of the selector bar 14 contacting with the end of the pivoted member 51 which in turn will transmit forward motion to the slide 36 through contact with the pin 49, and set the device in condition to lock upon rearward movement.

Thus it will be seen that I have provided a lock for an automobile which will prevent rearward movement of the same under all conditions with the exception of when it is desired to move the car in a rearward direction, or it is desired to coast rearwardly after first starting rearwardly by bringing the reverse gears into contact and then returning to neutral.

Having thus described my invention what I claim as new and desire to secure by Letters Patent of the United States is as follows:—

1. In a reverse movement lock mechanism, the combination of a gear box having a cover thereon, sliding selector bars carried by said cover, yokes carried by said selector bars, a shaft mounted within said gear box, sliding gears carried by said shaft and capable of being moved by said yokes, a stationary member surrounding said shaft and provided with recesses, dogs pivoted within said recesses, means for causing said dogs to move out of said recesses, an intermediate plate having orifices therein adapted to register with said recesses, a pin carried by said plate extending radially and adapted to control the movement of said plate with relation to said stationary member, a plate keyed to said shaft and provided with ratchet recesses to receive said dogs, a sliding member parallel to said selector bars and being adapted to be moved thereby for the purpose of preventing movement of said pin, and means for retaining said slide in locked or unlocked position.

2. In a device of the character described the combination of a gear box, a shaft mounted within said gear box, a stationary member surrounding said shaft, dogs carried by said stationary member, an intermediate member in contact with said stationary member, a plate keyed to said shaft and contacting with said intermediate member, a pin carried by said intermediate member, a slide mounted above said stationary member and adapted to be contacted by said pin, a cam surface formed on said slide, said slide being adapted to be moved into or out of contact with said pin for the purpose of preventing or allowing movement of said pin.

3. In a lock control mechanism, the combination of a sliding gear transmission lock having a pin extending radially therefrom, a slide mounted above said pin, rods extending from said slide and adapted to impart movement to said slide thereby allowing or preventing movements of said pin for the purpose of regulating the movement of said pin.

In testimony whereof, I have hereunto set my hand at San Francisco, California, this 27th day of May, 1919.

CHAS. P. CIRAC.

In presence of—
A. J. HENRY.